United States Patent
Ichimura et al.

(10) Patent No.: US 8,975,589 B2
(45) Date of Patent: Mar. 10, 2015

(54) SCINTILLATOR, RADIATION DETECTION APPARATUS, AND MANUFACTURING METHOD THEREOF

(71) Applicant: Canon Kabushiki Kaisha, Tokyo (JP)

(72) Inventors: Tomoaki Ichimura, Kitamoto (JP); Satoshi Okada, Tokyo (JP); Yohei Ishida, Honjo (JP); Akiya Nakayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/057,247

(22) Filed: Oct. 18, 2013

(65) Prior Publication Data

US 2014/0117244 A1    May 1, 2014

(30) Foreign Application Priority Data

Oct. 31, 2012 (JP) .................... 2012-241102
Oct. 8, 2013 (JP) .................... 2013-211432

(51) Int. Cl.
  *G01T 1/20* (2006.01)
  *G01T 1/202* (2006.01)

(52) U.S. Cl.
  CPC .................... *G01T 1/202* (2013.01)
  USPC ........................................ 250/366

(58) Field of Classification Search
  USPC ........................................ 250/366
  See application file for complete search history.

(56) References Cited

U.S. PATENT DOCUMENTS

| | | |
|---|---|---|
| 6,469,307 B2 | 10/2002 | Takabayashi et al. |
| 6,531,225 B1 | 3/2003 | Homme et al. |
| 6,573,506 B2 | 6/2003 | Sato et al. |
| 6,849,336 B2 | 2/2005 | Homme et al. |
| 7,034,306 B2 | 4/2006 | Homme et al. |
| 7,112,801 B2 | 9/2006 | Homme et al. |
| 7,132,665 B2 | 11/2006 | Sato et al. |
| 7,408,177 B2 | 8/2008 | Homme et al. |
| 7,705,315 B2 | 4/2010 | Homme et al. |
| 8,779,369 B2 * | 7/2014 | Ichimura et al. ............. 250/369 |
| 2002/0017613 A1 | 2/2002 | Homme et al. |
| 2010/0219349 A1* | 9/2010 | Furuichi et al. ............. 250/366 |
| 2011/0147602 A1* | 6/2011 | Ishida et al. ............ 250/370.11 |
| 2012/0001078 A1* | 1/2012 | McEvoy et al. ............. 250/366 |
| 2013/0026392 A1* | 1/2013 | Jagannathan et al. ..... 250/483.1 |
| 2014/0186594 A1* | 7/2014 | Jagannathan et al. ..... 428/195.1 |

FOREIGN PATENT DOCUMENTS

| | | | |
|---|---|---|---|
| JP | 2005283483 A | * 10/2005 | ............... G01T 1/20 |
| JP | 2008-261651 A | 10/2008 | |
| JP | 4279462 B2 | 6/2009 | |
| WO | 99/66348 A1 | 12/1999 | |

* cited by examiner

*Primary Examiner* — David J Makiya
*Assistant Examiner* — Taeho Jo
(74) *Attorney, Agent, or Firm* — Fitzpatrick, Cella, Harper & Scinto

(57) ABSTRACT

A scintillator has a two-dimensional array of a plurality of columnar crystals which converts radiation into light, and a covering portion covering the two-dimensional array. The covering portion includes connecting portions configured to partially connect the columnar crystals while partially forming cavities in gaps between the columnar crystals in the two-dimensional array.

19 Claims, 13 Drawing Sheets

F I G. 3A
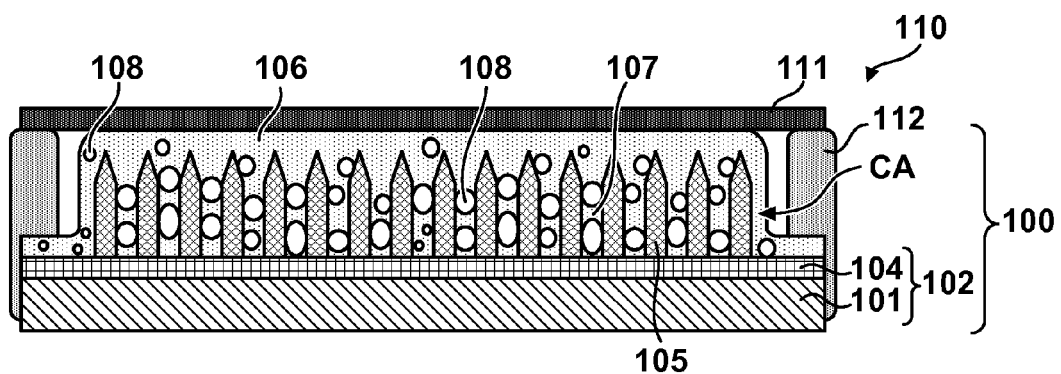
F I G. 3B
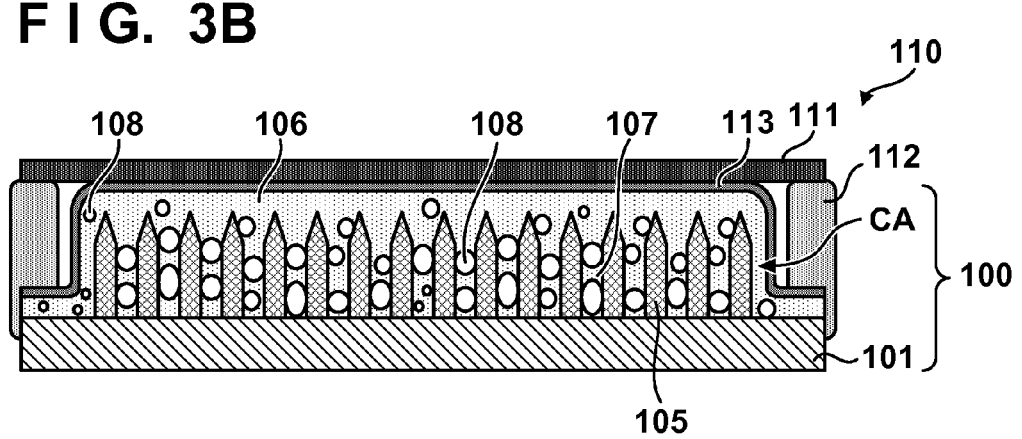

| VOLUME RATIO | 0% | 5% | 20% | 60% | 70% | 100% |
|---|---|---|---|---|---|---|
| SHARPNESS | × | ○ | ○ | ○ | ○ | ○ |
| SHOCK RESISTANCE | ○ | ○ | ○ | ○ | × | × |

SCINTILLATOR, RADIATION DETECTION APPARATUS, AND MANUFACTURING METHOD THEREOF

BACKGROUND OF THE INVENTION

1. Field of the Invention

The present invention relates to a scintillator, radiation detection apparatus, and manufacturing methods thereof.

2. Description of the Related Art

Recently, radiation detection apparatuses have been put into practical use, in which a photoelectric conversion substrate having an array of photoelectric conversion elements and a scintillator for converting radiation such as an X-ray into light with a wavelength detectable by the photoelectric conversion elements are stacked. As scintillators, for example, a scintillator made of an alkali halide material typified by a material prepared by doping Tl in CsI, and a scintillator made of a material prepared by doping Tb in GdOS are mainstream. Particularly, when vacuum deposition is performed using an alkali halide material, columnar crystals grow. However, the alkali halide material is highly deliquescent, so the scintillator needs to be covered with a highly moisture-proof protection structure.

Japanese Patent Laid-Open No. 2008-261651 discloses a method of suppressing decreases in the sensitivity and sharpness of a radiation detection apparatus by preventing entry of a protection layer resin into a scintillator. Japanese Patent No. 4279462 discloses a method of protecting a scintillator from external water vapor by covering the surface of the scintillator with an organic resin, and filling an organic resin in the gaps between columnar crystals forming the scintillator.

The alkali halide scintillator has gaps between columnar crystals. In the scintillator having the structure as disclosed in Japanese Patent Laid-Open No. 2008-261651, entry of a resin into gaps between columnar crystals is suppressed when forming a protection layer. Thus, decreases in sharpness and MTF (Modulation Transfer Function) can be suppressed. However, in the scintillator having the structure as disclosed in Japanese Patent Laid-Open No. 2008-261651, a shock applied to the scintillator is not distributed but is applied to columnar crystals, and the columnar crystals are readily damaged. To the contrary, when an organic resin is filled in the gaps between columnar crystals, as in the scintillator disclosed in Japanese Patent No. 4279462, a shock applied to the scintillator can be distributed. However, in the scintillator disclosed in Japanese Patent No. 4279462, a substance higher in refractive index than vacuum and air exists between columnar crystals. Thus, the refractive index difference between the columnar crystal and the organic resin in contact with it decreases. This impairs the light guiding effect in which light generated in the columnar crystal travels through the columnar crystal, decreasing the sharpness and MTF.

SUMMARY OF THE INVENTION

The present invention provides a scintillator advantageous for obtaining high shock resistance while suppressing a decrease in sharpness.

One of aspects of the present invention provides a scintillator comprising: a two-dimensional array of a plurality of columnar crystals configured to convert radiation into light; and a covering portion configured to cover the two-dimensional array, wherein the covering portion includes connecting portions configured to partially connect the columnar crystals while partially forming cavities in gaps between the columnar crystals in the two-dimensional array.

Further features of the present invention will become apparent from the following description of exemplary embodiments with reference to the attached drawings.

BRIEF DESCRIPTION OF THE DRAWINGS

FIGS. 3A and 3B are views schematically showing the sectional structure of a radiation detection apparatus according to an embodiment of the present invention;

FIG. 13 is a table for explaining the relationship between the sharpness and shock resistance of the scintillator and the volume ratio of the cavity according to the present invention.

DESCRIPTION OF THE EMBODIMENTS

The columnar crystals of a scintillator may be damaged when a shock is applied to the scintillator. More specifically, when a shock is applied to the scintillator, it propagates to each columnar crystal and deforms it. When a space such as air or vacuum exists between adjacent columnar crystals, each columnar crystal singly receives a force and thus is readily damaged. However, when a resin is filled in the gaps between the columnar crystals in order to prevent damage of columnar crystals, a shock applied to the scintillator can be received by a plurality of columnar crystals and the resin between them, improving the shock resistance.

However, when a resin is filled in the gaps between columnar crystals in order to improve the shock resistance of the scintillator, the following problem arises. For example, a case in which air having a refractive index of 1 exists in the gaps between columnar crystals made of CsI having a refractive index of 1.77, and a case in which a resin having a refractive index of 1.6 is filled will be compared. When air having a refractive index of 1 exists around CsI, the critical angle becomes 34°, and the interface between the columnar crystal and air can reflect light at an incident angle of 34° to 90°. In contrast, when a resin having a refractive index of 1.6 exists around CsI, the critical angle becomes 65°, and the interface between the columnar crystal and the resin can reflect only light at an incident angle of 65° to 90°. For this reason, the light guiding effect is impaired, and light is scattered in the scintillator, decreasing the sharpness.

However, even when the resin contacts the surfaces of columnar crystals, if cavities filled with air or the like are left without filling the resin in the entire gaps between the columnar crystals, the critical angle at the interface between the resin and the cavity becomes 39°, and the exit angle of light from the columnar crystal becomes 34°. The critical angle in a case in which columnar crystals are partially connected while cavities are partially formed in the gaps between the columnar crystals becomes equal to the critical angle in a case in which columnar crystals are completely separated by air. Therefore, light is not scattered, and a decrease in sharpness can be suppressed.

Considering this, the present invention adopts connecting portions for connecting columnar crystals while partially forming cavities in the gaps between the columnar crystals.

Figure 1A:
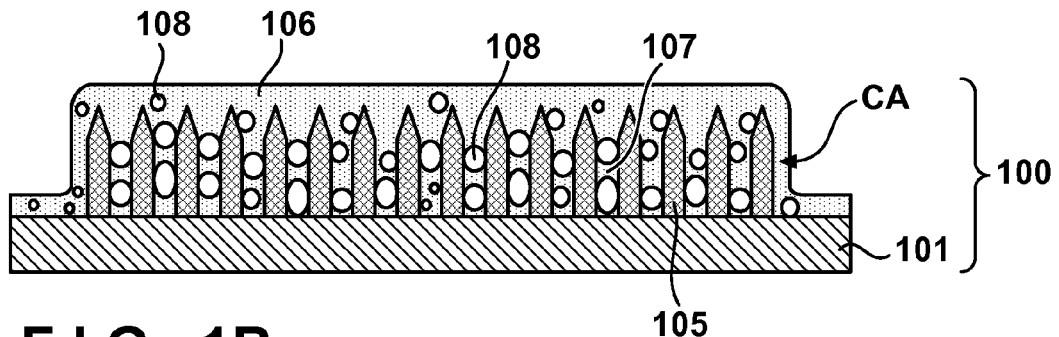
FIGS. 1A to 1D are views schematically showing the sectional structure of a scintillator according to an embodiment of the present invention.

Preferred embodiments of the present invention will now be exemplarily explained with reference to the accompanying drawings. FIG. 1A shows the sectional structure of a scintillator 100 according to an embodiment of the present invention. The scintillator 100 includes a two-dimensional array CA of columnar crystals 105 on a support substrate 101. The columnar crystals 105 can be formed by, for example, vacuum deposition. Each columnar crystal 105 converts radiation into light. The support substrate 101 functions as a substrate which supports the two-dimensional array CA of the columnar crystals 105. The scintillator 100 also includes a covering portion 106 which covers at least part (preferably all) of the two-dimensional array CA of the columnar crystals 105. The covering portion 106 can be made of, for example, an organic resin. The covering portion 106 includes connecting portions 107 which partially connect the columnar crystals 105 while partially forming cavities 108 in the gaps between the columnar crystals 105 in the two-dimensional array CA.

Partially connecting the columnar crystals 105 by the connecting portion 107 while partially forming the cavities 108 in the gaps between the columnar crystals 105 is advantageous for obtaining high shock resistance while suppressing a decrease in sharpness. More specifically, the presence of the cavities 108 can suppress a decrease in the light guiding effect of the columnar crystals 105, and thus can suppress a decrease in sharpness. Further, the shock resistance of the scintillator 100 can be enhanced by partially connecting the columnar crystals 105 by the connecting portions 107.

As shown in FIG. 13, the volume ratio ((volume of the cavities 108)/(volume of the covering portion 106)) of the cavities 108 to the covering portion 106 is preferably 5% (inclusive) to 60% (inclusive). If the volume ratio is equal to or higher than 5%, a decrease in sharpness can be suppressed.

If the volume ratio is equal to or lower than 60%, satisfactory shock resistance can be ensured. The volume ratio of the cavities 108 to the covering portion 106 can be obtained by analyzing an SEM image. For example, an image of the sections of the columnar crystals 105 and the covering portion 106 is acquired by an SEM. The volume ratio of the cavities 108 can be calculated from the contrast difference between the covering portion 106 and the cavities 108 in the acquired SEM image. Calculation of the volume ratio can use image analysis software such as software Transform available from Fortner Software LLC.

A mechanism of forming, in the covering portion 106, the cavities 108 partially formed in the gaps between the columnar crystals 105 will be considered. According to one mechanism, the two-dimensional array CA of the columnar crystals 105 is coated with a solution prepared by dissolving an organic resin serving as the covering portion 106 in an organic solvent, thereby filling the solution in the gaps between the columnar crystals 105. After that, the organic resin is cured into a mesh shape owing to cubical expansion generated when the organic solvent is vaporized by heating and drying, and the cavities 108 are formed in the gaps. According to another mechanism, the two-dimensional array CA is coated with a solution prepared by dissolving an organic resin serving as the covering portion 106 in an organic solvent, thereby filling the solution in the gaps between the columnar crystals 105. At this time, bubbles are mixed depending on the viscosity of the solution, forming the cavities 108. Hence, the volume ratio can be controlled by controlling the viscosity of the solution and temperatures at the time of heating and drying.

As shown in FIG. 13, for samples having volume ratios of 100% and 70%, the sharpness (MTF) is satisfactory, but the shock resistance is unsatisfactory. For a sample having a volume ratio of 0%, the shock resistance is satisfactory, but the sharpness is unsatisfactory. For samples having volume ratios of 5 to 60%, both the shock resistance and sharpness are satisfactory. A shock resistance test is a test of checking by SEM observation whether the columnar crystals 105 are damaged when a sample is dropped from a height of 2 m to a 0.7-mm thick AN100 glass available from Asahi Glass that is set on a concrete floor.

Figure 1B:
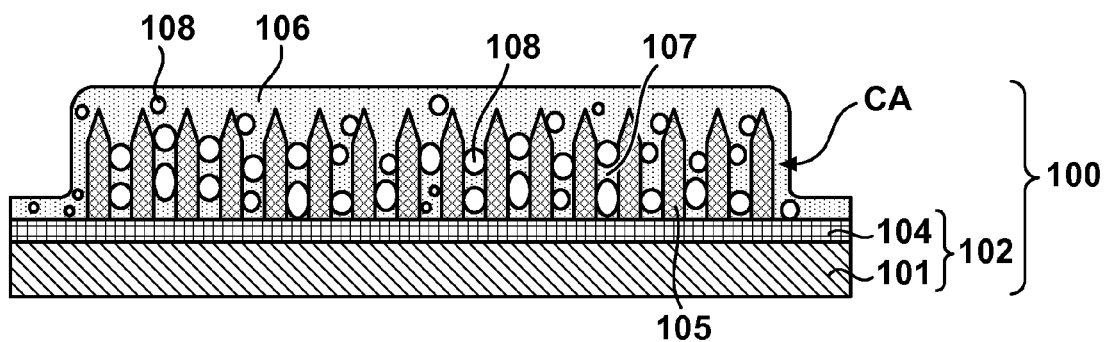
Figure 1C:
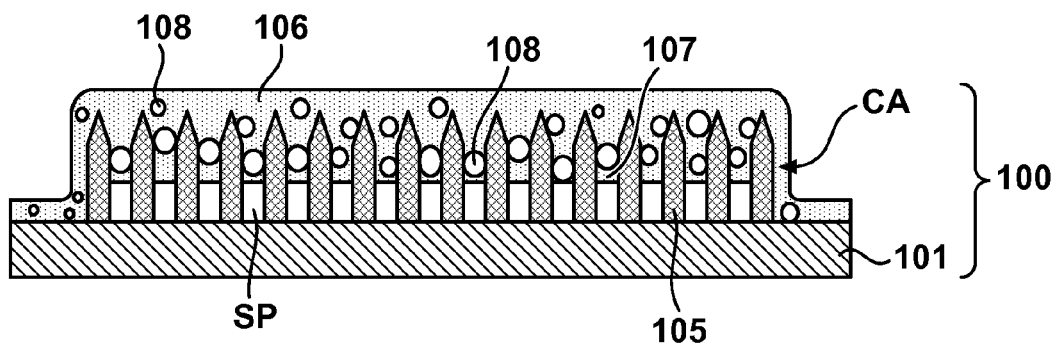
Figure 1D:
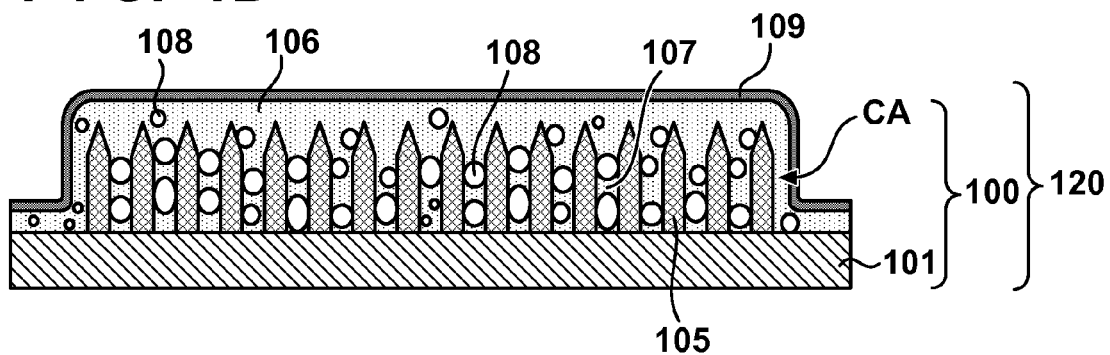

Further, as exemplified in FIG. 1D, the scintillator 100 can include a covering layer 109 which covers at least part (preferably all) of the covering portion 106. The covering layer 109 can be made of, for example, an organic resin. Forming the covering layer 109 can improve the shock resistance and moisture resistance. It is preferable that the covering layer 109 does not have a cavity in order to improve the moisture resistance and prevent scattering of generated light.

The material of the columnar crystal 105 is preferably a material mainly containing alkali halide, for example, a material selected from CsI:Tl, CsI:Na, CsBr:Tl, NaI:Tl, LiI:Eu, and KI:Tl. For example, when CsI:Tl is selected as the material, the columnar crystals 105 can be grown on the support substrate 101 by vapor deposition of simultaneously heating CsI and Tl in a vacuum chamber.

As exemplified in FIG. 1B, to improve the corrosion resistance of the support substrate 101, the columnar crystals 105 may be grown on a support substrate 102 obtained by covering at least part of the support substrate 101 with an undercoat layer 104.

As the support substrate 101, a substrate made of a metal such as Al, Mg, Be, or Fe, amorphous carbon, crystal carbon, or a resin such as PEEK, nylon, aramid, PPS, polyimide, CFRP, or GFRP is usable. As the support substrate 101, a substrate made of glass, quartz, alumina, silicon, or germanium is usable.

Figure 2A:
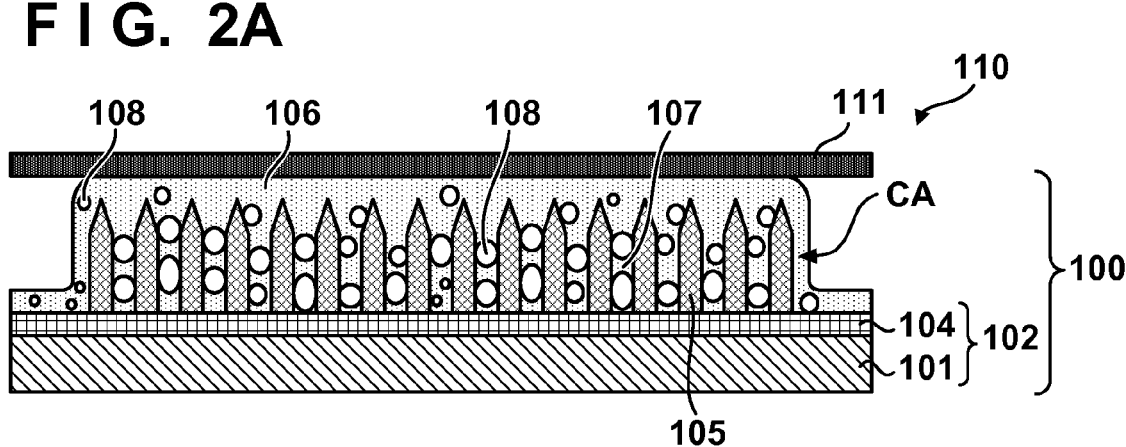
FIGS. 2A to 2C are views schematically showing the sectional structures of a scintillator and radiation detection apparatus according to an embodiment of the present invention.
Figure 2B:
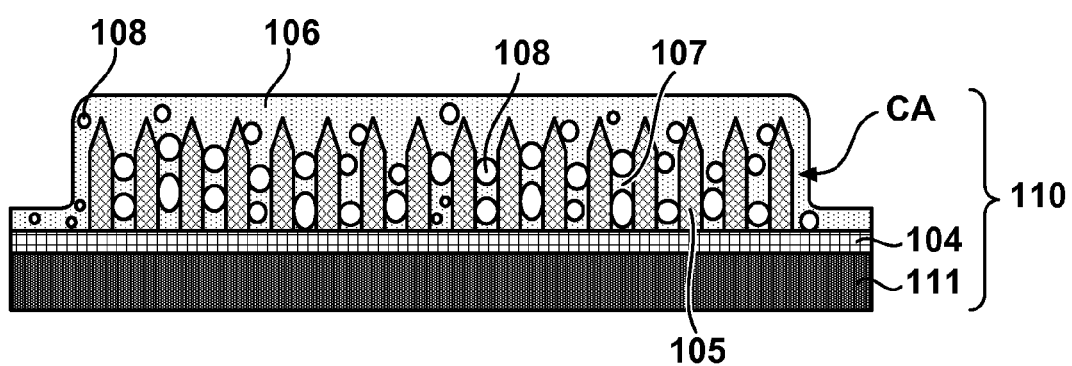

Alternatively, as exemplified in FIG. 2B, a photoelectric conversion substrate 111 may be used instead of the support substrate 101, and the two-dimensional array CA of the columnar crystals 105 may be formed on the photoelectric conversion substrate 111. Although the undercoat layer 104 may or may not exist, it is arranged in the example shown in FIG. 2B. The two-dimensional array CA of the columnar crystals 105 is formed on the photoelectric conversion substrate 111, obtaining a radiation detection apparatus 110.

The covering portion 106 is arranged to cover the two-dimensional array of the columnar crystals 105. The material of the covering portion 106 can include a material selected from the group consisting of, for example, polytetrafluoroethylene, polytrifluoroethylene chloride, a tetrafluoroethylene-propylene hexafluoride copolymer, polyvinyl fluoride, polyvinylidene fluoride, polyvinylidene chloride, a vinylidene chloride-vinyl chloride copolymer, a vinylidene chloride-acrylonitrile copolymer, polyvinyl chloride, an epoxy-based resin, an acrylic-based resin, a silicone-based resin, a urethane-based resin, a polyimide-based resin, cellulose acetate, cellulose nitrate, polymethyl methacrylate, polyvinyl butyral, polycarbonate, polyethylene, a polyamide-based resin (for example, nylon), a polyester-based resin (for example, polyethylene terephthalate), a styrene-butadiene-based rubber resin, and polyparaxylylene.

The shock resistance of the scintillator 100 can be improved by forming the cavities 108 in a region in addition to the gaps between the columnar crystals 105, as exemplified in FIGS. 1A to 1D. Alternatively, as exemplified in FIG. 1C, a space SP may be formed in a region to a predetermined distance from the end faces of the columnar crystals 105 forming the two-dimensional array CA on the side of the support substrate 101. In the space SP, the columnar crystals 105 are not connected by the connecting portions 107. When the space SP is formed in addition to the connecting portions 107, it exhibits the shock-absorbing capability and can improve the shock resistance.

When the covering portion 106 is formed by coating, it can be formed by a coating method such as spin coating, dip coating, spray coating, die coating, bar coating, or curtain coating. When the covering portion 106 is formed from an organic substance dissolved in an organic solvent, the organic substance is arranged to cover the two-dimensional array of the columnar crystals 105, and then drying and polymerization by heating can be performed. For heating, a dryer such as a hot plate, heated-air dryer, IR heater, vacuum dryer, or microwave dryer is available. When the covering portion 106 is formed from a thermoplastic resin such as a hot-melt resin, a pressure bonding method such as a roll laminator or a thermal pressure bonding method is available.

The covering layer 109 is arranged to cover at least part of the covering portion 106. The covering layer 109 can be made of, for example, an organic resin or inorganic material.

The organic resin is selectable from the group consisting of, for example, polytetrafluoroethylene, polytrifluoroethylene chloride, a tetrafluoroethylene-propylene hexafluoride copolymer, polyvinyl fluoride, polyvinylidene fluoride, polyvinylidene chloride, a vinylidene chloride-vinyl chloride copolymer, a vinylidene chloride-acrylonitrile copolymer, polyvinyl chloride, an epoxy-based resin, an acrylic-based resin, a silicone-based resin, a urethane-based resin, a polyimide-based resin, cellulose acetate, cellulose nitrate, polymethyl methacrylate, polyvinyl butyral, polycarbonate, polyethylene, a polyamide-based resin (for example, nylon), a polyester-based resin (for example, polyethylene terephthalate), a styrene-butadiene-based rubber resin, and polyparaxylylene.

The inorganic material can be $SiO_2$ or $Al_2O_3$. The covering layer 109 may be, for example, a film called a barrier film obtained by forming a layer of the inorganic material on a polyester resin or nylon resin.

The material of the covering layer 109 may be the same as or different from that of the covering portion 106. The covering layer 109 is not an indispensable building element. When the covering layer 109 is formed from an organic substance dissolved in an organic solvent, the organic substance is arranged to cover the covering portion 106, and then drying and polymerization by heating can be performed. For heating, a dryer such as a hot plate, heated-air dryer, IR heater, vacuum dryer, or microwave dryer is usable. When the covering layer 109 is formed from a thermoplastic resin such as a hot-melt resin, a pressure bonding method such as a roll laminator or a thermal pressure bonding method is usable.

The connecting portions 107 form part of the covering portion 106, and the material of the connecting portions 107 can be the same as that of the covering portion 106. Each connecting portion 107 is connected to at least two columnar crystals 105. The connecting portion 107 includes a plurality of portions spaced apart from each other in the axial direction of the columnar crystal 105 (normal direction of the surface of the support substrate 101). The cavity 108 is formed between portions adjacent to each other among the plurality of portions. The cavity 108 is formed between portions adjacent to each other among the plurality of portions forming the connecting portion 107. The interval in the axial direction between adjacent portions among the plurality of portions forming the connecting portion 107 can be, for example, 100 nm (inclusive) to 20 μm (inclusive). To enhance the light guiding effect, the interval is preferably equal to or larger than the emission wavelength of the columnar crystal 105. If the size of the cavity 108 is equal to or smaller than the emission wavelength, the cavity 108 does not exist when viewed from light. This is equivalent to a case in which the cavity 108 is filled with a material forming the connecting portion 107. For example, when the columnar crystal 105 is made of Tl-doped CsI, the emission wavelength is 550 nm. Thus, the interval in the axial direction between adjacent portions among the plurality of portions forming the connecting portion 107 is preferably equal to or larger than 550 nm.

The refractive index in the cavity 108 needs to be lower than that of the material forming the covering portion 106 (connecting portion 107). Considering that the covering portion 106 (connecting portion 107) can be made of a resin having a refractive index of about 1.4 to 1.7, the refractive index in the cavity 108 is preferably about 1.0 to 1.3. The cavity 108 is, for example, a vacuum space or gas-filled space. The gas can be air or an inert gas. The inert gas can be a gas selected from a rare gas such as helium gas, neon gas, argon gas, krypton gas, or xenon gas, nitrogen gas, and the like.

The covering portion 106 including the cavities 108 and connecting portions 107 can be formed through a coating step of coating the two-dimensional array CA of the columnar crystals 105 with a resin, and a heating step of heating the resin. In the coating step, the two-dimensional array CA can be coated with the resin so as to form bubbles in the resin. In the coating step, the two-dimensional array CA can be coated with the resin by spin coating, dip coating, spray coating, die coating, or screen printing. Alternatively, in the coating step, the two-dimensional array CA can be coated with the resin by a roll laminator. The cavities 108 can be formed by coating the two-dimensional array CA with a resin containing bubbles (for example, microbubbles) in the coating step. Alternatively, the cavities 108 can be formed by generating bubbles in the resin when the resin applied to the two-dimensional array CA in the coating step enters gaps between the columnar crystals 105. In the latter case, for example, the two-dimensional array CA is preferably coated with a resin having a viscosity of 500 cps or higher.

When spin coating or dip coating is performed as the coating method in the coating step, the two-dimensional array CA is preferably coated with a resin having a viscosity of 3 cps (inclusive) to 2,000 cps (inclusive). At a viscosity of lower than 3 cps, the cavities 108 readily disappear in the heating step, and it may become difficult to ensure the satisfactory cavities 108. At a viscosity of higher than 2,000 cps, striped coating nonuniformity may appear in the coating step. When spray coating is performed as the coating method in the coating step, the two-dimensional array CA is preferably coated with a resin having a viscosity of 3 cps (inclusive) to 100 cps (inclusive). At a viscosity of higher than 100 cps, the solution cannot be atomized from a spray nozzle, and a floccular foreign substance may be formed on the surface. When die coating or screen printing is performed as the coating method in the coating step, the two-dimensional array CA is preferably coated with a resin having a viscosity of 3 cps (inclusive) to 50,000 cps (inclusive). In any coating method, the film thickness can be controlled to a preferable value by executing coating a plurality of times.

Alternatively, the covering portion 106 including the cavities 108 and connecting portions 107 can be formed through a step of bonding a resin or the like containing the cavities 108 to the two-dimensional array CA of the columnar crystals 105. In the step of bonding a resin or the like containing the cavities 108, the covering portion 106 can be formed by bonding a resin containing bubbles such as microbubbles to the two-dimensional array CA by a roll laminator. The cavities 108 can be formed by bonding a resin containing bubbles (for example, microbubbles) to the two-dimensional array CA in the coating step.

The covering portion 106 may be formed through a coating step of coating the two-dimensional array CA of the columnar crystals 105 with a resin, a step of forming bubbles in the resin by reducing a pressure in a space where the resin applied to the two-dimensional array CA exists, and a heating step of heating the resin. The covering portion 106 may be formed through a coating step of coating the two-dimensional array CA of the columnar crystals 105 with a resin solution, and a heating step of heating the resin solution. In the heating step, the cavities 108 can be formed by vaporizing the solvent of the resin solution.

When the two-dimensional array CA of the columnar crystals 105 is coated with a resin containing bubbles (for example, microbubbles) in the coating step, the bubbles can be formed by, for example, the following method. The first method is a gas-liquid shear method of forming a vortex flow in a resin or resin solution, and shearing or crushing gas trapped in the vortex flow by a screw or the like. The second method is a pressurization-depressurization method of dissolving a large volume of gas in a resin or resin solution at a high pressure, and then generating bubbles again by reducing a pressure. The third method is a method using a porous glass film in which gas is emitted from a film pored at the nano level.

When the scintillator 100 and photoelectric conversion substrate 111 are arranged via the covering portion 106, as exemplified in FIG. 2A, the light transmittance of the covering portion 106 for light having a wavelength of 250 nm to 650 nm is preferably equal to or higher than 50%. When the columnar crystals 105 are grown on the photoelectric conversion substrate 111, as exemplified in FIG. 2B, no light need be extracted via the covering portion 106, and thus the light transmittance of the covering portion 106 may be 0%.

FIG. 2A schematically shows the sectional structure of the radiation detection apparatus 110 according to one embodiment of the present invention. The radiation detection apparatus 110 includes the scintillator 100 and photoelectric conversion substrate 111. The photoelectric conversion substrate 111 can be, for example, a sensor in which photoelectric conversion elements (not shown) are two-dimensionally arrayed on a glass substrate, or a sensor (for example, CMOS sensor or CCD sensor) in which photoelectric conversion elements (not shown) are two-dimensionally arrayed on a silicon substrate. When photoelectric conversion elements are formed on a glass substrate, the element structure is not particularly limited, and the sensor can be, for example, a MIS sensor or PIN sensor.

Figure 2C:
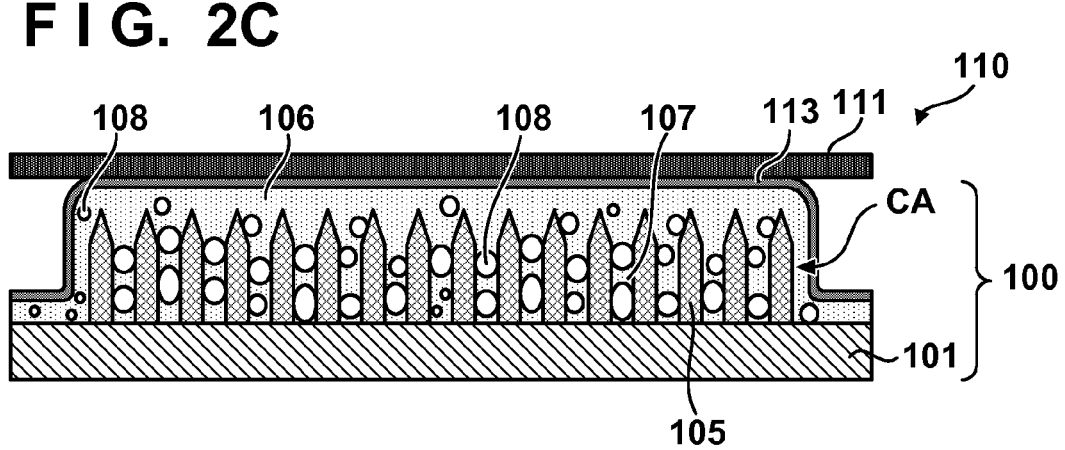

As exemplified in FIG. 2C, an adhesion layer 113 may be arranged at least partially between the scintillator 100 and the photoelectric conversion substrate 111 in order to prevent misalignment of the scintillator 100 and photoelectric conversion substrate 111. Alternatively, to suppress decreases in luminance and sharpness caused by the adhesion layer 113, the peripheries of the scintillator 100 and photoelectric conversion substrate 111 may be sealed with a sealing resin 112, as exemplified in FIG. 3A. Alternatively, the scintillator 100 and photoelectric conversion substrate 111 may be connected using both the adhesion layer 113 and sealing resin 112, as exemplified in FIG. 3B.

The adhesion layer 113 can be formed from, for example, an adhesive resin, a pressure sensitive adhesive sheet having an adhesion property at room temperature, or a hot-melt resin exhibiting an adhesion property upon heating. Alternatively, the adhesion layer 113 can be formed from an adhesive resin such as an epoxy-based resin, an acrylic-based resin, a silicone-based resin, a urethane-based resin, a polyimide-based resin, a polyester-based resin, or a polyolefin-based resin.

The sealing resin 112 is preferably made of a material having a high modulus of elasticity in terms of the shock resistance. Examples of this material are an epoxy-based resin, an acrylic-based resin, a silicone-based resin, a urethane-based resin, a polyimide-based resin, a polyamide-based resin, a polyester-based resin (for example, polyethylene terephthalate), polyparaxylylene, polytetrafluoroethylene, polytrifluoroethylene chloride, a tetrafluoroethylene-propylene hexafluoride copolymer, polyvinyl fluoride, polyvinylidene fluoride, polyvinylidene chloride, a vinylidene chloride-vinyl chloride copolymer, a vinylidene chloride-acrylonitrile copolymer, polyvinyl chloride, a styrene-butadiene rubber-based resin, and a polyolefin-based resin.

First Embodiment

Figure 4A:
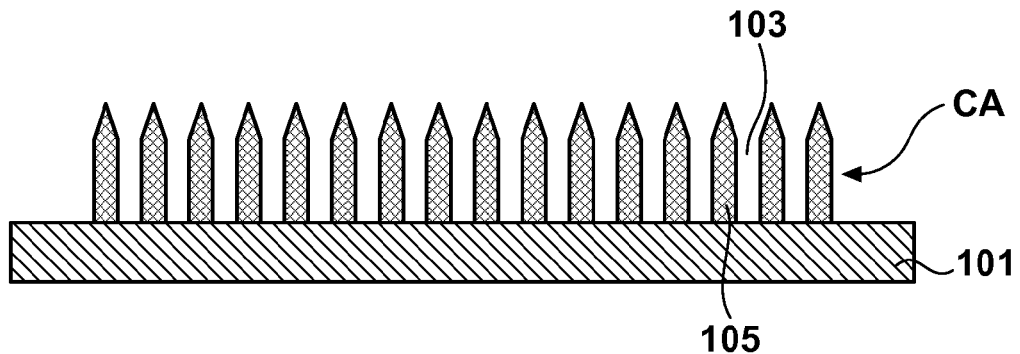
FIGS. 4A to 4C are sectional views schematically showing a method of manufacturing a scintillator and radiation detection apparatus according to an embodiment of the present invention.

A method of manufacturing a scintillator 100 and a radiation detection apparatus 110 including it according to the first embodiment will be explained exemplarily. As exemplified in FIG. 4A, a two-dimensional array CA of columnar crystals 105 was formed on a support substrate 101 by vacuum deposition. When the columnar crystals 105 are made of CsI:Tl, they can be formed by co-deposition of CsI (cesium iodide) and TlI (thallium iodide). More specifically, columnar crystals could be formed by the following method. First, CsI and TlI were filled in a resistance heating boat, and the support substrate 101 was set on a rotating holder. Then, the interior of a deposition apparatus was evacuated by a vacuum pump, Ar gas was introduced to adjust the degree of vacuum to be 0.1 Pa, and then deposition was performed. As a result, the two-dimensional array CA of the columnar crystals 105 was formed on the support substrate 101. As the support substrate 101, a 1-mm thick amorphous carbon substrate was used.

Figure 4B:
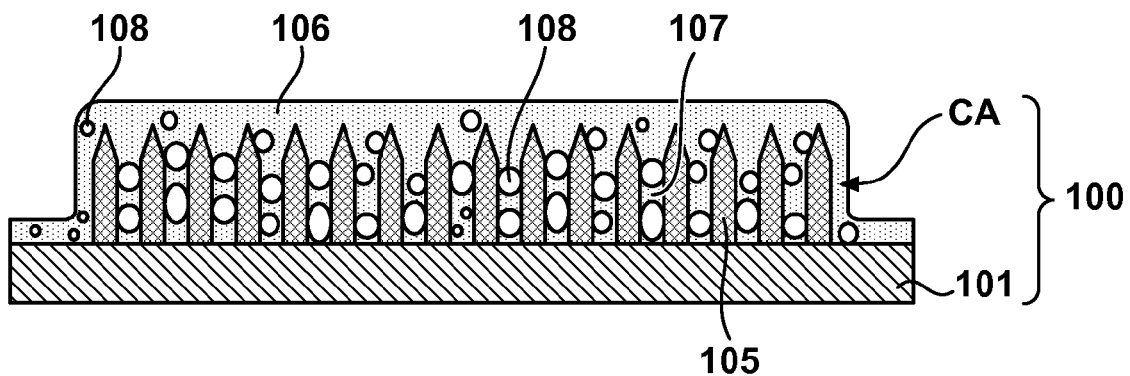

Subsequently, the two-dimensional array CA was coated with a microbubble-containing resin solution by spin coating. The resin solution was heated to remove the solvent in it. Accordingly, a covering portion 106 including cavities 108 and connecting portions 107 was obtained, as exemplified in FIG. 4B. In this example, the microbubble-containing resin solution was prepared by introducing Ar gas, which is an inert gas, via a porous glass film into a vinylidene chloride solution whose viscosity was adjusted to 5 cps by dissolution in N-methylpyrrolidone. The diameter of the microbubble was 0.5 µm. The two-dimensional array CA of the columnar crystals 105 was coated with the microbubble-containing vinylidene chloride solution, and left to stand for 1 min. The microbubble-containing solution then permeated gaps 103 between the columnar crystals 105. After the resin solution was spun off by using a spin coater at a rotational speed of 500 rpm, it was dried at 120° C. for 60 min to remove the solvent. As a result, the covering portion 106 including the cavities 108 and connecting portions 107 in the gaps 103 between the columnar crystals 105 was formed, as exemplified in FIG. 4B. In this manner, the scintillator 100 was obtained.

Figure 4C:
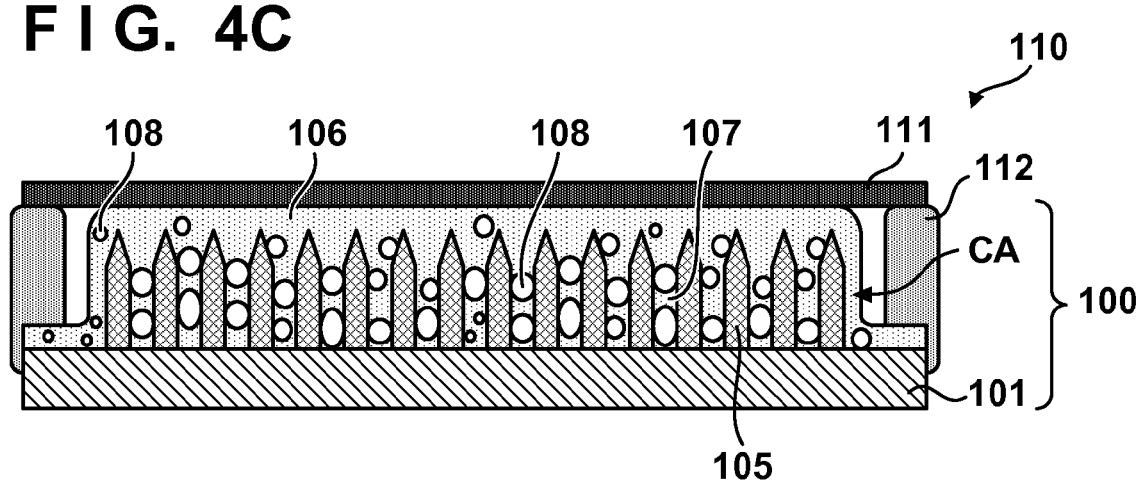

Next, a radiation detection apparatus 110 was fabricated by combining a photoelectric conversion substrate 111 and the scintillator 100. In this example, a CMOS sensor was employed as the photoelectric conversion substrate 111. After the photoelectric conversion substrate 111 and scintillator 100 were arranged to face each other, they were connected while the periphery of the radiation detection apparatus 110 was sealed with a sealing resin 112, as exemplified in FIG. 4C. In this case, a dispenser available from Musashi Engineering was used for the formation of the sealing resin 112. As the sealing resin 112, a silicone resin TSE3976 available from Momentive Performance Materials was used. TSE3976 is a soft material having a Shore hardness of A30, can absorb a stress applied to the end of the scintillator 100, and can provide a radiation detection apparatus 110 with high shock resistance.

The scintillator 100 fabricated by the above-described steps has a structure in which adjacent columnar crystals are partially connected to each other while cavities are partially formed in the gaps between adjacent columnar crystals. Thus, the first embodiment provides a scintillator which hardly suffers a decrease in sharpness, compared to a scintillator in which the resin is completely filled in the gap between columnar crystals, and which is excellent in shock resistance, compared to a scintillator in which the gap between columnar crystals is completely separated by a space.

Second Embodiment

A method of manufacturing a radiation detection apparatus 110 according to the second embodiment will be explained exemplarily. In this example, to reduce the cost by simplifying the structure and process, the radiation detection apparatus 110 is fabricated by forming a two-dimensional array CA of columnar crystals 105 on a heat-resistant photoelectric conversion substrate 111, and forming a covering portion 106 on the resultant structure.

Figure 5A:
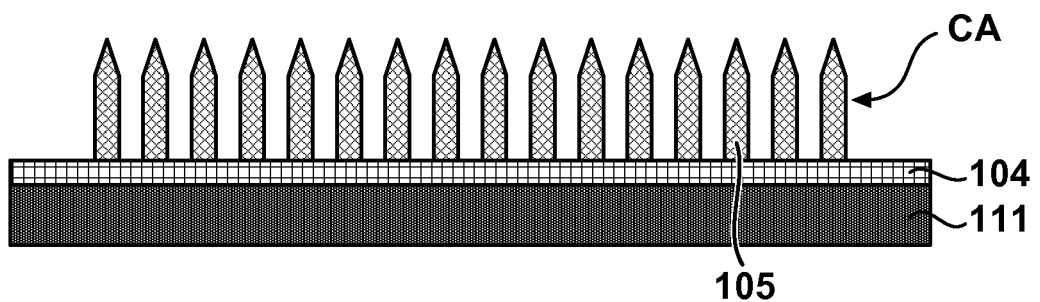
FIGS. 5A and 5B are sectional views schematically showing a method of manufacturing a scintillator and radiation detection apparatus according to an embodiment of the present invention.

First, as exemplified in FIG. 5A, a two-dimensional array CA of columnar crystals 105 was formed on a photoelectric conversion substrate 111 by vacuum deposition. When the columnar crystals 105 are made of CsI:Tl, they can be formed by co-deposition of CsI (cesium iodide) and TlI (thallium iodide). More specifically, columnar crystals could be formed by the following method. First, CsI and TlI were filled in a resistance heating boat, and the photoelectric conversion substrate 111 having an undercoat layer 104 was set on a rotating holder. Then, the interior of a deposition apparatus was evacuated by a vacuum pump, Ar gas was introduced to adjust the degree of vacuum to be 0.1 Pa, and then deposition was performed. As a result, the two-dimensional array CA of the columnar crystals 105 was formed on the undercoat layer 104 of the photoelectric conversion substrate 111. As the photoelectric conversion substrate 111, a CMOS sensor was employed. As the undercoat layer 104, a 10-µm thick polyimide resin was employed.

Figure 5B:
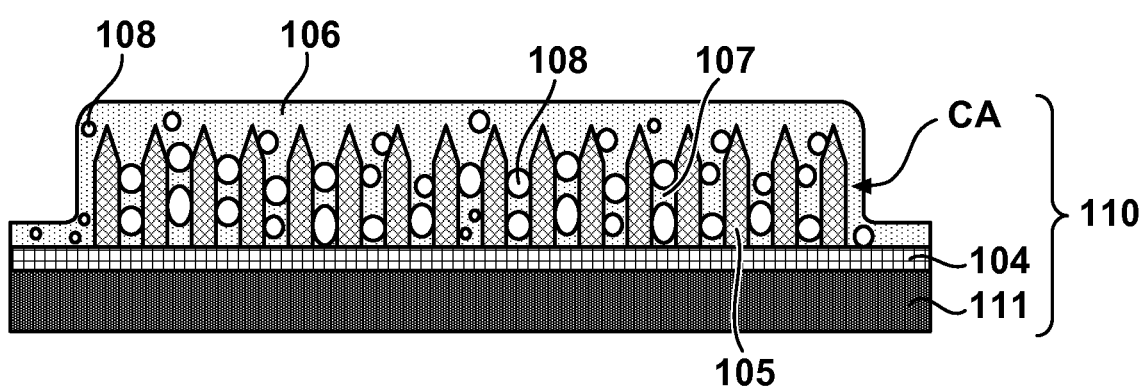

Subsequently, the two-dimensional array CA was coated with a microbubble-containing resin solution by spin coating. The resin solution was heated to remove the solvent in it. Accordingly, a covering portion 106 including cavities 108 and connecting portions 107 was obtained, as exemplified in FIG. 5B. In this example, the microbubble-containing resin solution was prepared by introducing nitrogen, which is an inert gas, via a porous glass film into Elepcoat available from Nitto Sinko, which is a styrene-butadiene rubber resin and had a viscosity adjusted to be 5 cps by dilution with methylcyclohexane. The diameter of the microbubble was 0.5 µm. The two-dimensional array CA of the columnar crystals 105 was coated with the microbubble-containing Elepcoat solution, and left to stand for 1 min. The microbubble-containing solution then permeated gaps 103 between the columnar crystals 105. After the resin solution was spun off by using a spin coater at a rotational speed of 500 rpm, it was dried at 100° C. for 1 h to remove the solvent. As a result, the covering portion 106 including the cavities 108 and connecting portions 107 in the gaps 103 between the columnar crystals 105 was formed, as exemplified in FIG. 5B. In this manner, a radiation detection apparatus 110 was obtained.

Third Embodiment

A method of manufacturing a scintillator 100 and a radiation detection apparatus 110 including it according to the third embodiment will be explained exemplarily. In the third embodiment, a covering portion 106 including cavities 108 and connecting portions 107 is formed by thermally pressure-bonding a bubble-containing hot-melt resin to a two-dimensional array CA of columnar crystals 105, and making the heated hot-melt resin enter the gaps between the adjacent columnar crystals 105. The cavities 108 can be formed from bubbles in the hot-melt resin and bubbles which originally exist in the gaps between the adjacent columnar crystals 105.

Figure 6A:
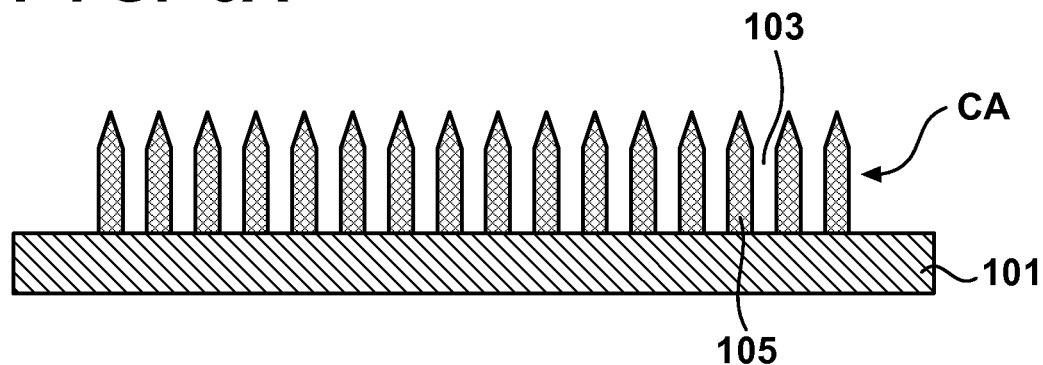
FIGS. 6A and 6B are sectional views schematically showing a method of manufacturing a scintillator and radiation detection apparatus according to an embodiment of the present invention.

First, as exemplified in FIG. 6A, a two-dimensional array CA of columnar crystals 105 was formed by the same method as that in the first embodiment on a support substrate 101 made of a 1-mm thick PEEK resin.

Figure 6B:
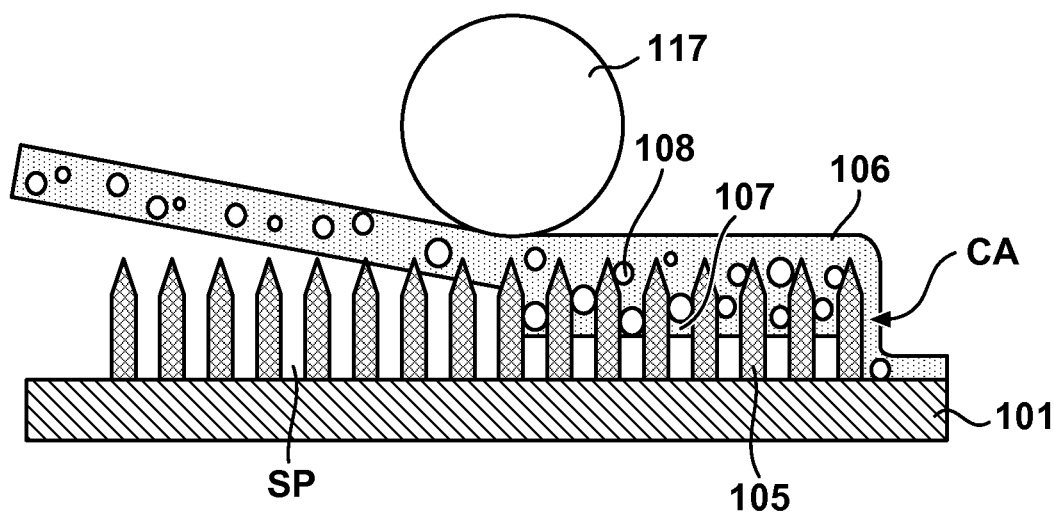

Then, as exemplified in FIG. 6B, a roll laminator having a heating/pressurization function was heated to 100° C., a bubble-containing hot-melt resin was pressurized to the two-dimensional array CA at 0.3 MPa, and the resin entered gaps 103 between the columnar crystals 105. Accordingly, a covering portion 106 including cavities 108 and connecting portions 107 was formed.

Figure 7A:
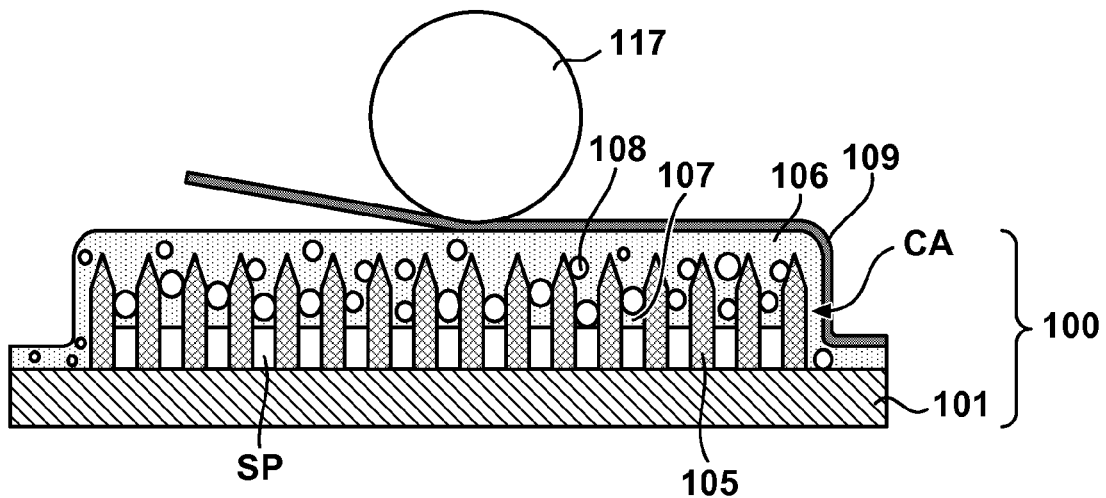
FIGS. 7A and 7B are sectional views schematically showing a method of manufacturing a scintillator and radiation detection apparatus according to an embodiment of the present invention.
Figure 7B:
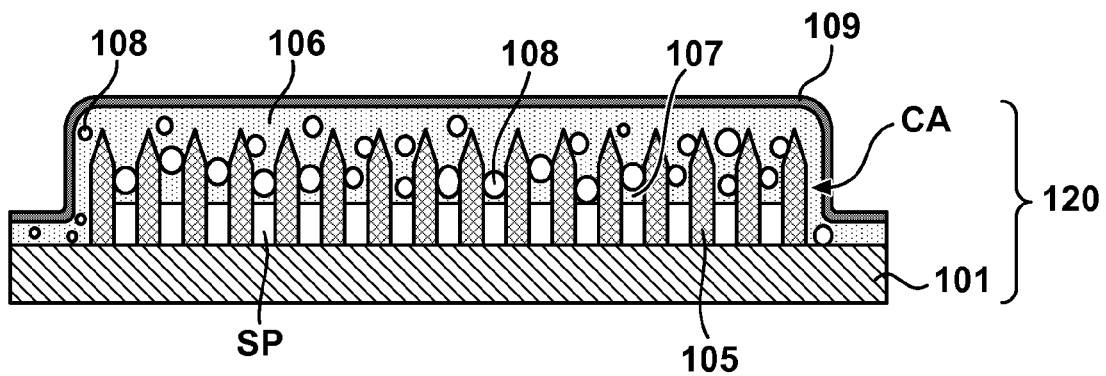

After that, as illustrated in FIG. 7A, a 20-µm thick PET film was adhered as a covering layer 109 onto the covering portion 106. A hot-melt resin is a resin which exhibits an adhesive property many times by heating. For this reason, the hot-melt resin and PET film can be adhered by arranging the PET film on the hot-melt resin formed as the covering portion 106, and pressurizing it at 0.3 MPa by a roll laminator heated to 100° C. By the above steps, a scintillator 120 as exemplified in FIG.

7B was obtained. The scintillator 120 fabricated in the third embodiment can have a space SP in a region to a predetermined distance from the end faces of the columnar crystals 105 forming the two-dimensional array CA on the side of the support substrate 101.

Fourth Embodiment

A method of manufacturing a scintillator 100 and a radiation detection apparatus 110 including it according to the fourth embodiment will be explained exemplarily. In the fourth embodiment, a scintillator was fabricated using a support substrate 101 having a high X-ray transmittance and high corrosion resistance.

Figure 8A:
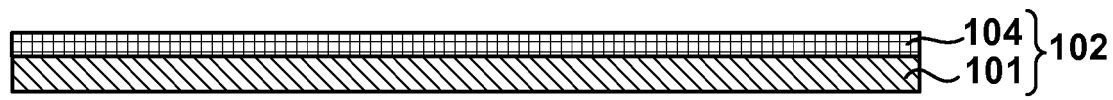
FIGS. 8A to 8C are sectional views schematically showing a method of manufacturing a scintillator and radiation detection apparatus according to an embodiment of the present invention.
Figure 8B:
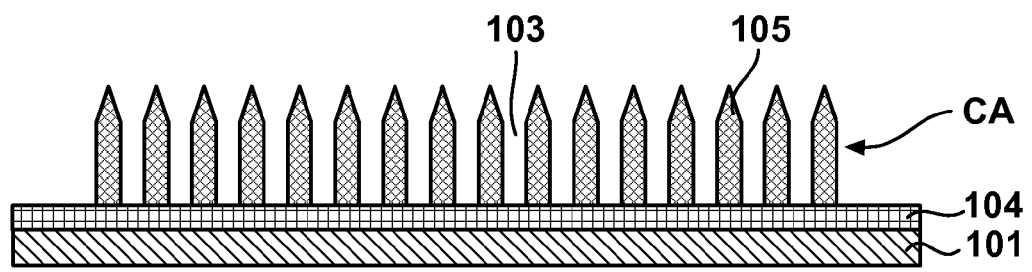

First, as exemplified in FIG. 8A, a 0.5-mm thick aluminum plate was prepared as the support substrate 101. To prevent corrosion of the aluminum plate by columnar crystals 105, a 5-μm thick polyimide resin was formed as an undercoat layer 104 on the aluminum plate by spin coating, thereby obtaining a support substrate 102. Then, as exemplified in FIG. 8B, a two-dimensional array CA of columnar crystals 105 was formed on the undercoat layer 104 by the same method as that in the first embodiment.

Figure 8C:
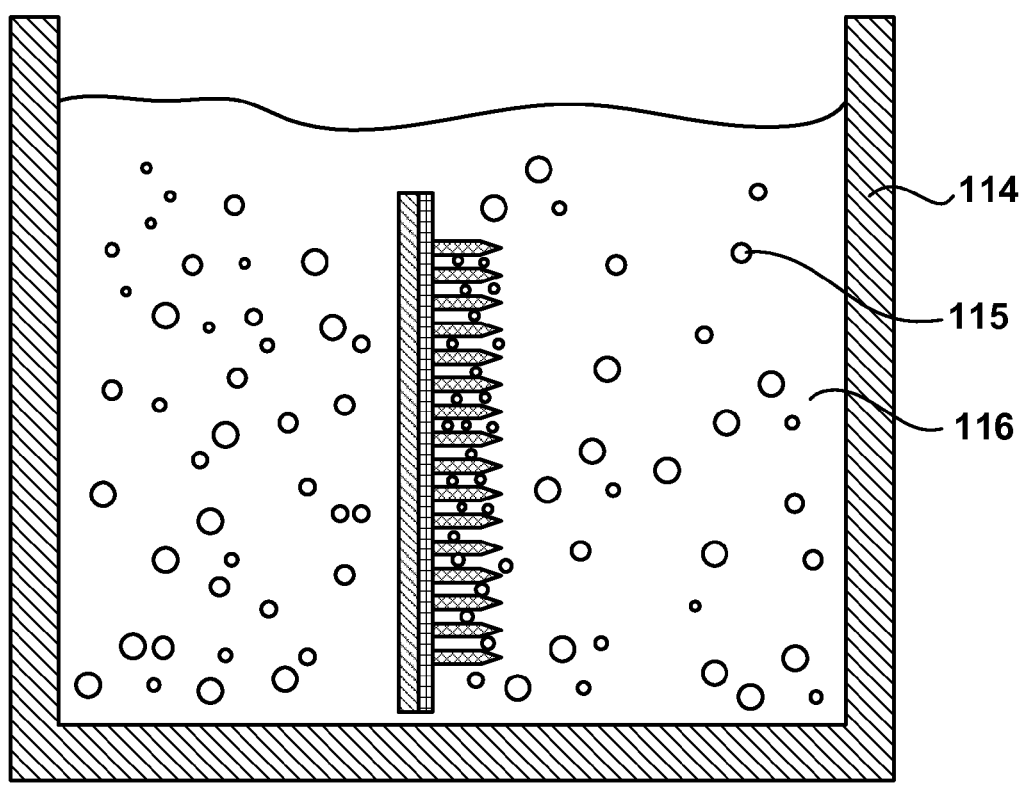
Figure 9A:
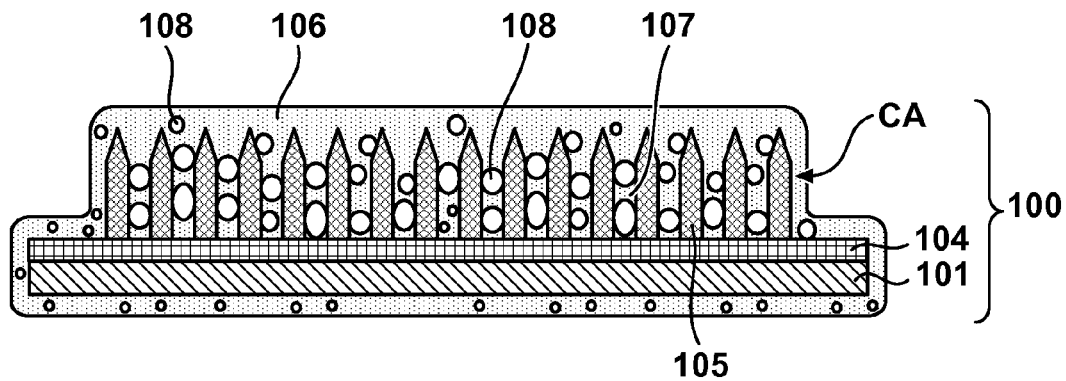
FIGS. 9A to 9C are sectional views schematically showing a method of manufacturing a scintillator and radiation detection apparatus according to an embodiment of the present invention.

After that, a covering portion 106 was formed on the two-dimensional array CA of the columnar crystals 105 by dip coating. More specifically, as exemplified in FIG. 8C, a structure having the two-dimensional array CA of the columnar crystals 105 on the support substrate 102 was dipped in a resin solution containing microbubbles 115. Accordingly, the covering portion 106 including cavities 108 and connecting portions 107 was obtained, as exemplified in FIG. 9A. More specifically, the resin solution containing the microbubbles 115 was prepared by introducing an inert gas (nitrogen) via a porous glass film into a vinylidene chloride solution 116 whose viscosity was adjusted to 5 cps by dissolution in N-methylpyrrolidone. The diameter of the microbubble 115 was 0.5 μm. The structure having the two-dimensional array CA of the columnar crystals 105 on the support substrate 102 was dipped in the vinylidene chloride solution containing the microbubbles 115, and left to stand for 10 min in a dip bath 114. The microbubble-containing solution 116 entered gaps 103 between the columnar crystals 105. After the structure was pulled up at 5 mm/sec, it was dried by a heated-air dryer at 120° C. for 60 min to remove the solvent. As a result, the scintillator 100 including the covering portion 106 as exemplified in FIG. 9A was obtained.

Figure 9B:
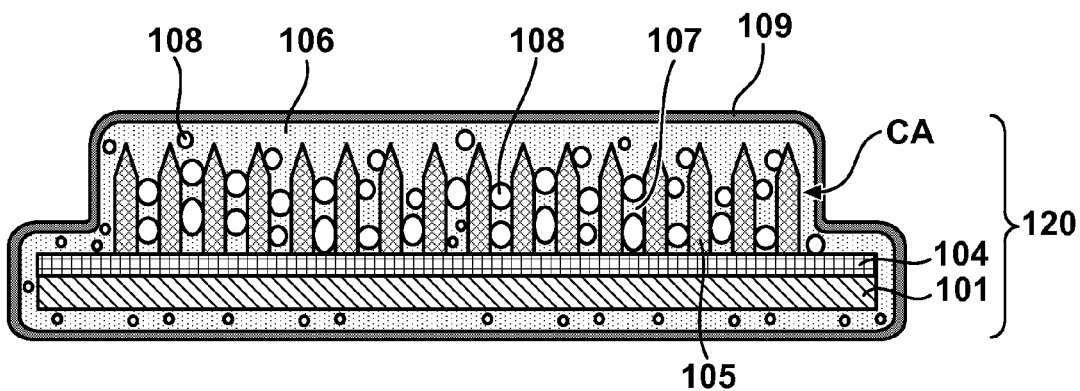

Next, as exemplified in FIG. 9B, highly moisture-proof polyparaxylylene was applied as a covering layer 109 by CVD to cover at least part of the covering portion 106, thereby forming a scintillator 120 including the covering layer 109. Note that the covering layer 109 is an arbitrary building element.

Figure 9C:
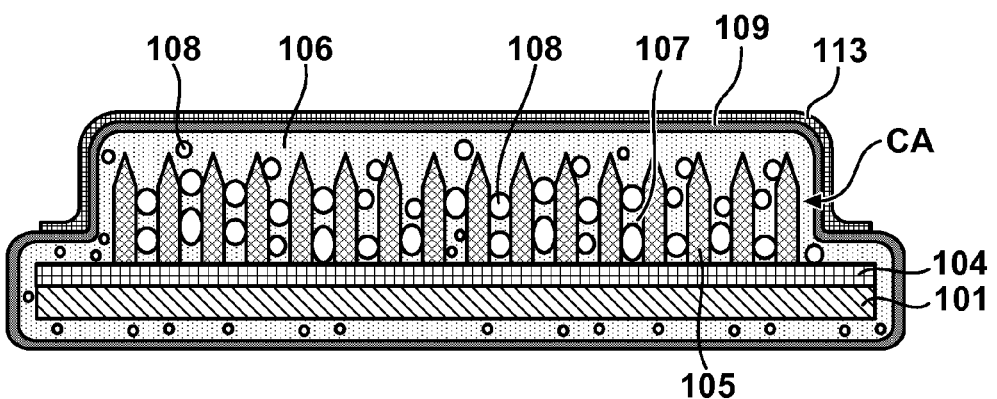

Thereafter, a radiation detection apparatus 110 was fabricated by bonding a photoelectric conversion substrate 111 and the scintillator 120. In this example, a CMOS sensor was employed as the photoelectric conversion substrate 111. First, as exemplified in FIG. 9C, an adhesion layer 113 was adhered to the scintillator 100 by using a roll laminator. As the adhesion layer 113, a 50-μm thick acrylic-based adhesive CS9621 available from Nitto Denko was used.

Figure 10A:
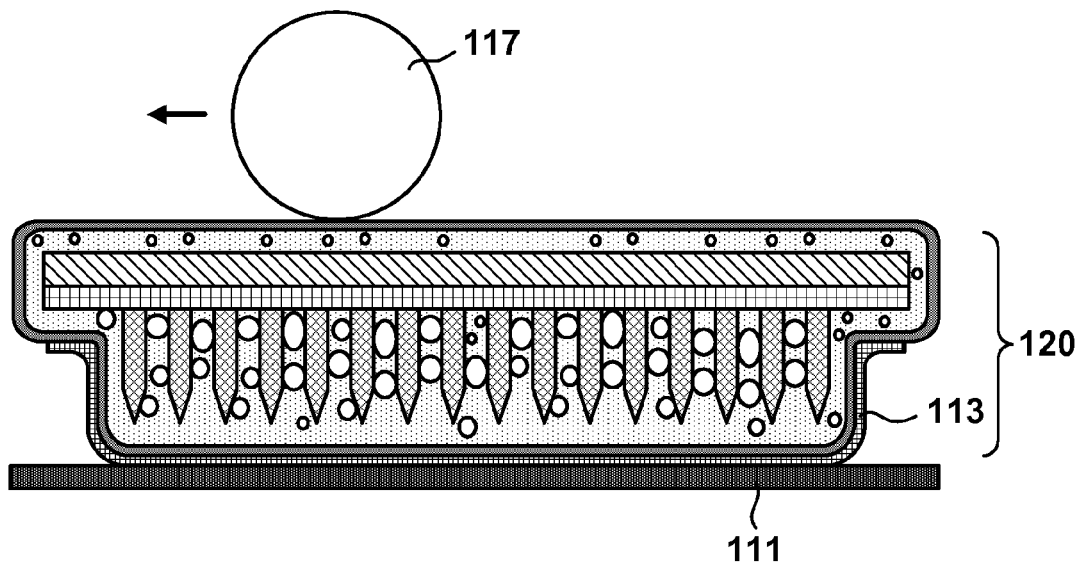
FIGS. 10A and 10B are sectional views schematically showing a method of manufacturing a scintillator and radiation detection apparatus according to an embodiment of the present invention.
Figure 10B:
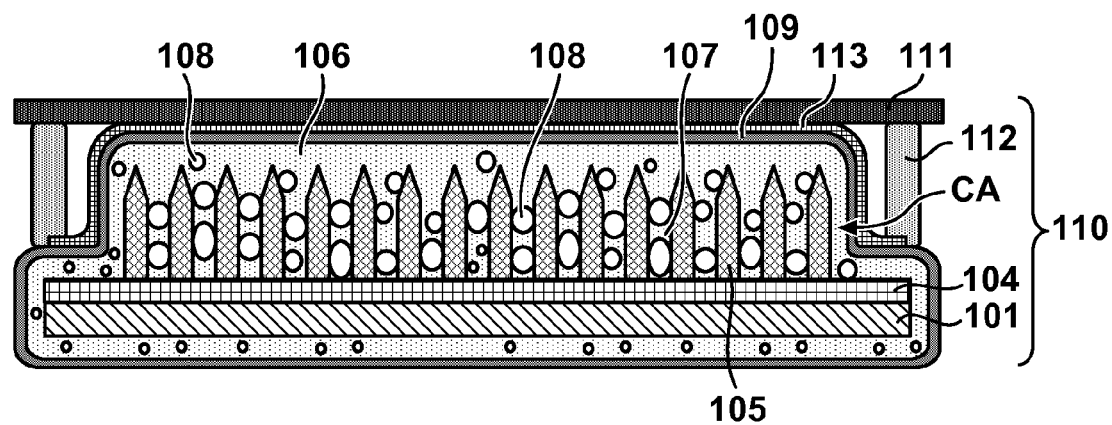

As exemplified in FIG. 10A, the scintillator 120 was bonded to the photoelectric conversion substrate 111 by pressurizing the scintillator 120 by using a roll laminator 117. As exemplified in FIG. 10B, a sealing resin 112 was formed. A dispenser available from Musashi Engineering was used for the formation of the sealing resin 112. As the sealing resin 112, a silicone resin TSE3976 available from Momentive Performance Materials was used. TSE3976 is a soft material having a Shore hardness of A30, can absorb a stress applied to the end of the scintillator 100, and can provide a radiation detection apparatus 110 with high shock resistance.

Fifth Embodiment

A method of manufacturing a scintillator 100 according to the fifth embodiment will be explained exemplarily. In the manufacturing method according to the fifth embodiment, a highly volatile solvent is used as the solvent of a resin solution for forming a covering portion 106. Cavities are formed between columnar crystals by vaporizing the solvent of the resin solution applied to a two-dimensional array of columnar crystals.

Figure 11A:
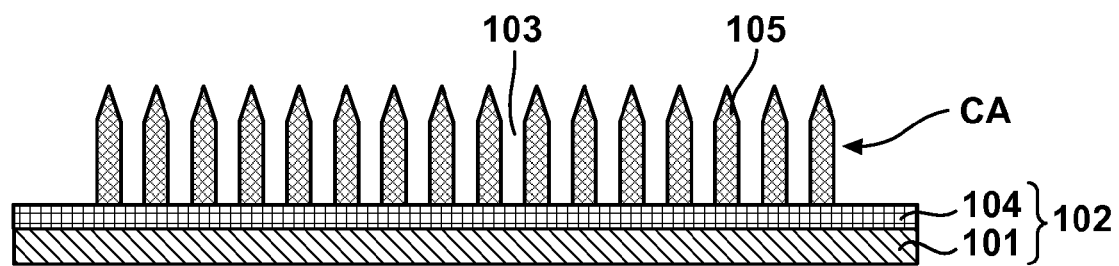
FIGS. 11A and 11B are sectional views schematically showing a method of manufacturing a scintillator and radiation detection apparatus according to an embodiment of the present invention.

First, as exemplified in FIG. 11A, a 1-mm thick CFRP substrate was prepared as a support substrate 101, and a two-dimensional array CA of columnar crystals 105 was formed by the same method as that in the fir first embodiment.

Figure 11B:
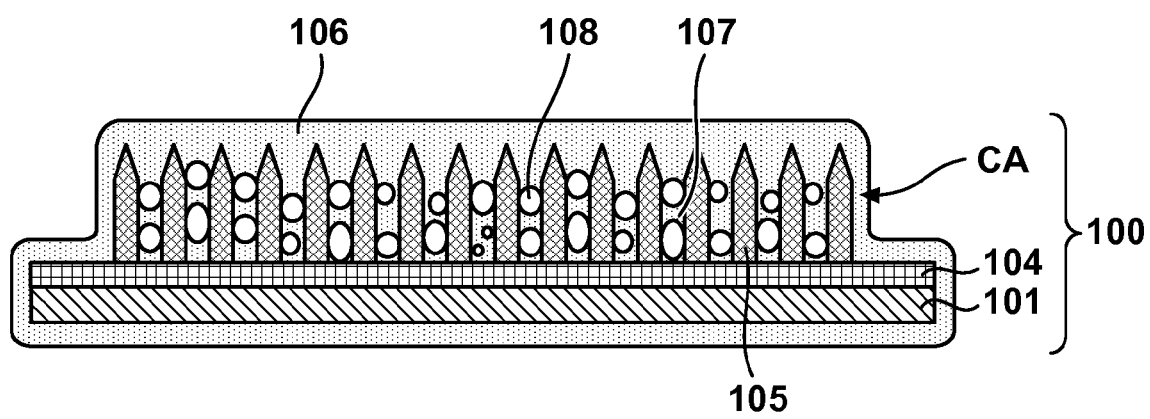

Then, as exemplified in FIG. 11B, the two-dimensional array CA was coated with a resin by dip coating of dipping, in a resin solution, a structure in which the two-dimensional array CA of the columnar crystals 105 was formed on the support substrate 101. In this example, a vinylidene chloride solution whose viscosity was adjusted to 50 cps was used as the resin solution. As the solvent of this solution, methyl ethyl ketone having a boiling point of 79° C. was used. By using the solvent having a boiling point of 79° C., the surface can be dried simultaneously when the structure is pulled up from the resin solution at 1 mm/sec, and the solvent can be encapsulated in the resin.

After that, quick heating was performed using an IR heater to vaporize the solvent left in the gaps 103 between the columnar crystals 105, thereby forming cavities 108.

Sixth Embodiment

A method of manufacturing a scintillator 100 according to the sixth embodiment will be explained exemplarily. In the manufacturing method according to the sixth embodiment, a covering portion 106 is used by spray coating in place of dip coating in the fourth embodiment.

First, as exemplified in FIG. 8A, a 0.5-mm thick aluminum plate was prepared as a support substrate 101. To prevent corrosion of the aluminum plate by columnar crystals 105, a 5-μm thick polyimide resin was formed as an undercoat layer 104 on the aluminum plate by spin coating, thereby obtaining a support substrate 102. Then, as exemplified in FIG. 8B, a two-dimensional array CA of columnar crystals 105 was formed on the undercoat layer 104 by the same method as that in the fourth embodiment.

Figure 12A:
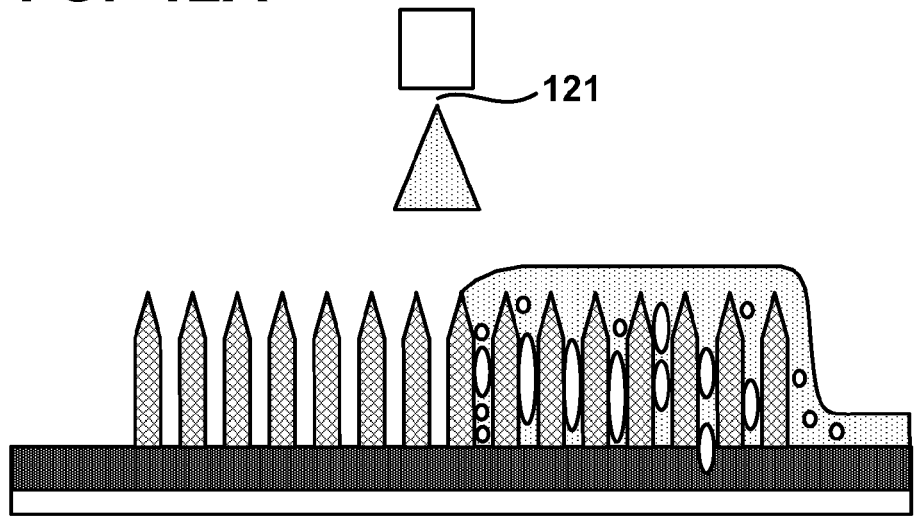
FIGS. 12A to 12C are sectional views schematically showing a method of manufacturing a scintillator and radiation detection apparatus according to an embodiment of the present invention.
Figure 12B:
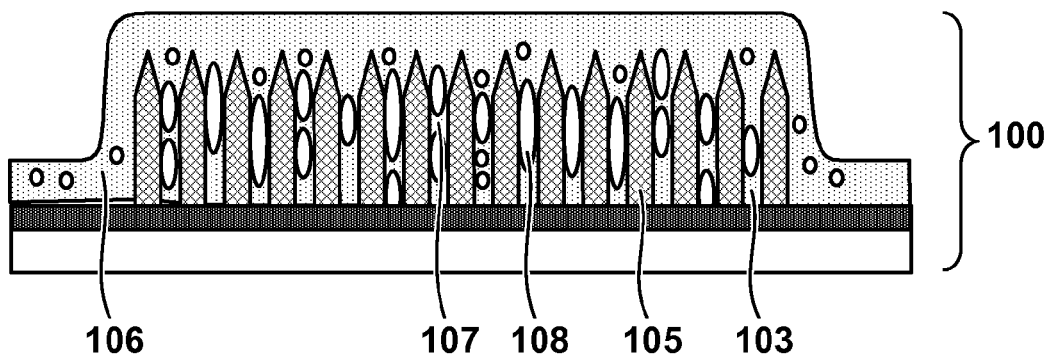

As exemplified in FIG. 12A, a covering portion 106 was formed on the two-dimensional array CA of the columnar crystals 105 by spray coating. More specifically, as exemplified in FIG. 12A, a structure having the two-dimensional array CA of the columnar crystals 105 on the support substrate 102 was coated with a solution prepared by dissolving polyvinylidene chloride in cyclopentanone. The solution was then dried by a heated-air dryer to remove the solvent, obtaining the covering portion 106 including cavities 108 and connecting portions 107, as exemplified in FIG. 12B. More specifically, a polyvinylidene chloride solution which was prepared by dissolving vinylidene chloride in cyclopentanone and had a viscosity adjusted to 20 cps was sprayed and applied by using a spray nozzle 121, as shown in FIG. 12A. In spray coating, the covering portion 106 having the connecting portions 107 can be formed by mixing a solution to be applied and air left between columns, and forming the cavities 108 between the columns. After that, the solution was dried by a heated-air dryer at 100° C. for 60 min to remove the solvent.

Figure 12C:
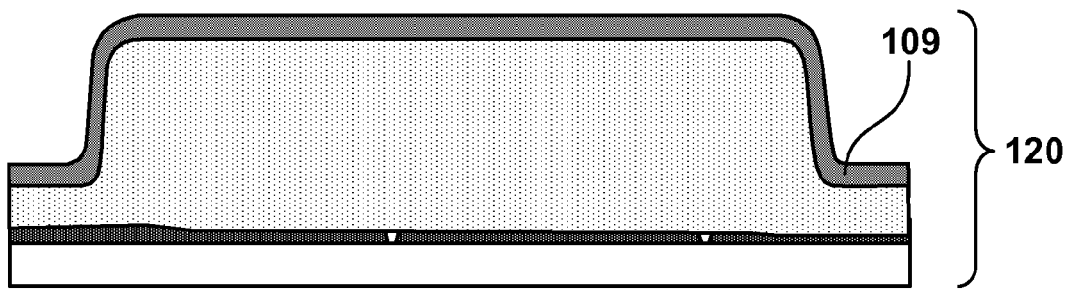

Then, as exemplified in FIG. 12C, the polyvinylidene chloride solution was further applied as a covering layer 109. Also in this case, a solution which was prepared by dissolving polyvinylidene chloride in cyclopentanone and had a viscosity adjusted to 20 cps was used. The solvent was dried by a heated-air dryer at 100° C. for 180 min. At this time, the columnar crystals 105 were already covered with the covering portion 106. In forming the covering layer 109, air between the columnar crystals 105 and a solution to be applied are not mixed. Thus, the covering layer 109 can be formed without containing the cavities 108. Accordingly, a scintillator 120 can be formed.

Thereafter, a radiation detection apparatus 110 was fabricated by bonding a photoelectric conversion substrate 111 and the scintillator 120. In this embodiment, a CMOS sensor was employed as the photoelectric conversion substrate 111. As an adhesion layer 113, a 25-μm thick acrylic adhesive PDS1 available from Panac was used.

Similar to the fourth embodiment, as exemplified in FIG. 10A, the scintillator 120 was bonded to the photoelectric conversion substrate 111 by pressurizing the scintillator 120 by using a roll laminator 117. As exemplified in FIG. 10B, a sealing resin 112 was formed. A dispenser available from Musashi Engineering was used for the formation of the sealing resin 112. As the sealing resin 112, a silicone resin TSE3976 available from Momentive Performance Materials was used. TSE3976 is a soft material having a Shore hardness of A30, can absorb a stress applied to the end of the scintillator, and can provide a radiation detection apparatus 110 with high shock resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-241102, filed Oct. 31, 2012, and 2013-211432, filed Oct. 8, 2013, which are hereby incorporated by reference herein in their entirety.

What is claimed is:

1. A scintillator comprising:
   a two-dimensional array of a plurality of columnar crystals configured to convert radiation into light; and
   a covering portion configured to cover the two-dimensional array,
   wherein the covering portion includes connecting portions configured to partially connect the columnar crystals while partially forming cavities in gaps between the columnar crystals in the two-dimensional array.

2. The scintillator according to claim 1, wherein the cavity has a refractive index lower than a refractive index of the covering portion.

3. The scintillator according to claim 2, wherein the cavity is one of a vacuum space and a gas-filled space.

4. The scintillator according to claim 1, further comprising a substrate configured to support the two-dimensional array.

5. The scintillator according to claim 4, wherein the substrate includes an undercoat layer arranged to contact end faces of the plurality of columnar crystals, forming the two-dimensional array, on a side of the substrate.

6. The scintillator according to claim 4, wherein in a region to a predetermined distance from end faces of the plurality of columnar crystals, forming the two-dimensional array, on a side of the substrate, the plurality of columnar crystals are not connected by the connecting portions, and a space is formed.

7. The scintillator according to claim 1, wherein the covering portion contains a material selected from a group consisting of polytetrafluoroethylene, polytrifluoroethylene chloride, a tetrafluoroethylene-propylene hexafluoride copolymer, polyvinyl fluoride, polyvinylidene fluoride, polyvinylidene chloride, a vinylidene chloride-vinyl chloride copolymer, a vinylidene chloride-acrylonitrile copolymer, polyvinyl chloride, an epoxy-based resin, an acrylic-based resin, a silicone-based resin, a urethane-based resin, a polyimide-based resin, cellulose acetate, cellulose nitrate, polymethyl methacrylate, polyvinyl butyral, polycarbonate, polyethylene, a polyamide-based resin, a polyester-based resin, a styrene-butadiene rubber-based resin, and polyparaxylylene.

8. The scintillator according to claim 1, wherein the connecting portion includes a plurality of portions spaced apart from each other in an axial direction of the columnar crystal, and the cavity is formed between adjacent portions among the plurality of portions.

9. The scintillator according to claim 8, wherein an interval in the axial direction between the adjacent portions among the plurality of portions is not smaller than 100 nm and not larger than 20 μm.

10. A radiation detection apparatus comprising:
    a scintillator defined in claim 1; and
    a photoelectric conversion substrate on which a plurality of photoelectric conversion elements for detecting light from the scintillator are arrayed.

11. A scintillator manufacturing method comprising the steps of:
    forming a two-dimensional array of a plurality of columnar crystals which convert radiation into light; and
    forming a covering portion to cover the two-dimensional array,
    wherein the covering portion includes connecting portions configured to connect the columnar crystals while partially forming cavities in gaps between the columnar crystals in the two-dimensional array.

12. The method according to claim 11, wherein
    the step of forming the covering portion includes a coating step of coating the two-dimensional array with a resin, and a heating step of heating the resin, and
    in the coating step, the two-dimensional array is coated with the resin to form a bubble in the resin.

13. The method according to claim 12, wherein in the coating step, the two-dimensional array is coated with the resin by one of spin coating, dip coating, spray coating, die coating, and screen printing.

14. The method according to claim 12, wherein the coating step includes a step of pressure-bonding the resin to the two-dimensional array by a roll laminator.

15. The method according to claim 12, wherein in the coating step, the two-dimensional array is coated with a bubble-containing resin.

16. The method according to claim 12, wherein a bubble is generated in the resin when the resin applied to the two-dimensional array permeates the gaps between the plurality of columnar crystals.

17. The method according to claim 11, wherein the step of forming the covering portion includes a coating step of coating the two-dimensional array with a resin, a step of forming a bubble in the resin by reducing a pressure in a space where the resin applied to the two-dimensional array exists, and a heating step of heating the resin.

18. The method according to claim 11, wherein
the step of forming the covering portion includes a coating step of coating the two-dimensional array with a resin solution, and a heating step of heating the resin, and
in the heating step, a solvent of the resin solution is vaporized to form the cavity.

19. A method of manufacturing a radiation detection apparatus including a scintillator, and a photoelectric conversion substrate on which a plurality of photoelectric conversion elements for detecting light from the scintillator are arrayed, comprising the step of forming the scintillator according to a manufacturing method defined in claim 11.

* * * * *